(12) United States Patent
Tung et al.

(10) Patent No.: US 6,179,652 B1
(45) Date of Patent: Jan. 30, 2001

(54) IC CARD CONNECTOR ASSEMBLY

(75) Inventors: Shun-Chi Tung; Tsu-Yang Wu; Wen-Hsing Lin, all of Tu-Chen (TW)

(73) Assignee: Hon Hai Precision Ind. Co., Ltd., Taipei Hsein (TW)

(*) Notice: Under 35 U.S.C. 154(b), the term of this patent shall be extended for 0 days.

(21) Appl. No.: 09/430,364

(22) Filed: Oct. 28, 1999

(30) Foreign Application Priority Data

Apr. 27, 1999 (TW) .................................................. 88206556

(51) Int. Cl.[7] .................................................. H01R 12/20
(52) U.S. Cl. .................................................. 439/541.5
(58) Field of Search .................................. 439/541.5, 64, 439/79

(56) References Cited

U.S. PATENT DOCUMENTS

| | | | |
|---|---|---|---|
| 5,286,207 | * | 2/1994 | McHugh .................. 439/541.5 |
| 5,636,999 | * | 6/1997 | Hirai et al. ............... 439/541.5 |
| 5,688,130 | * | 11/1997 | Huang ..................... 439/541.5 |
| 5,775,923 | * | 7/1998 | Tomioka .................. 439/541.5 |

* cited by examiner

*Primary Examiner*—Gary F. Paumen
(74) *Attorney, Agent, or Firm*—Wei Te Chung

(57) ABSTRACT

An IC card connector assembly comprises stacked upper and lower connectors and a rear socket attached thereto. The upper connector includes an upper header and a row of upper contacts retained in the upper header. The upper header comprises a pair of upper sidebars each defining an upper recess in an outside face thereof. The lower connector includes a lower header and a row of lower contacts retained in the lower header. The lower header comprises a pair of lower sidebars each defining a lower recess in an outside face thereof. The rear socket includes an elongate base and a pair of arms upwardly extending from opposite ends of the base. The base defines two rows of cavities. In a semi-assembled state, the arms are received in the lower recesses with a gap defined therebween thereby, the rear socket being deflectably toward the lower contacts assembled to the upper and lower connectors for facilitating arrangement of the lower contacts in one of the two rows of cavities of the rear socket.

1 Claim, 8 Drawing Sheets ions between the spacer 7 and the rear socket 8. Furthermore, each arm 32 forms a flange 38 laterally extending therefrom for abutting against the stepped peripheral wall 28 of the lower head 20.

IC CARD CONNECTOR ASSEMBLY

BACKGROUND OF THE INVENTION

1. Field of the Invention

The present invention generally relates to an IC (Integrated Circuit) card connector assembly, and particularly to a stacked IC card connector assembly having an improved lower header and an improved rear socket for facilitating arrangement of contact tails of contacts of the connectors in a rear socket.

2. Description of the Prior Art

An IC card connector is commonly adopted within a notebook computer for providing electrical connection between an IC card and the notebook computer whereby the IC card can be read or written on. IC card connectors are often stacked and mounted on a printed circuit board (PCB) by a rear socket, such as the disclosures of Taiwan Patent Application Nos. 83218076 and 84112508, and U.S. Pat. Nos. 5,636,999 and 5,688,130. The assembly of the connectors with the rear socket faces some problems, as explained below.

Referring to FIG. 1, a conventional IC card connector assembly 100 comprises a header 102, two rows of top contacts 104 received in a top portion of the header 102, two rows of bottom contacts 106 received in a bottom portion of the header 102. A rear socket 108 is mounted on a printed circuit board to electrically connect with the connector assembly 100, thereby achieving an electrical connection between the assembly 100 and the printed circuit board. Each top contact 104 comprises a top contact tail 112 and each bottom contact 106 comprises a bottom contact tail 114. Before the contact tails 114, 116 are inserted into the rear socket 108, if the top and bottom contact tails 114, 116 are deflected from a vertical position, they will be very difficult to be inserted into the rear socket 108 to achieve a proper electrical connection therewith, because the tails 114, 116 can only be assembled with the rear socket 108 in a vertical direction. Hence, an improved mechanism is required.

SUMMARY OF THE INVENTION

Accordingly, a purpose of the present invention is to provide an IC card connector assembly comprising stacked upper and lower connectors, and a rear socket being deflectably attaching to the upper and lower connectors for facilitating arrangement of contact tails thereof in the rear socket.

To fulfill the above purpose, an IC card connector assembly comprises stacked upper and lower connectors and a rear socket attached thereto. The upper connector includes an upper header and a row of upper contacts retained in the upper header. The upper header comprises a pair of upper sidebars each defining an upper recess in an outside face thereof. The lower connector includes a lower header and a row of lower contacts retained in the lower header. The lower header comprises a pair of lower sidebars each defining a lower recess in an outside face thereof. The rear socket includes an elongate base and a pair of arms upwardly extending from opposite ends of the base. The base defines two rows of cavities. In a semi-assembled state, the arms are received in the lower recesses with a gap defined therebween thereby, the rear socket being deflectably toward the lower contacts for facilitating arrangement of the lower contacts in one row of the two rows of cavities of the rear socket.

DETAILED DESCRIPTION OF THE PREFERRED EMBODIMENT

Figure 1:
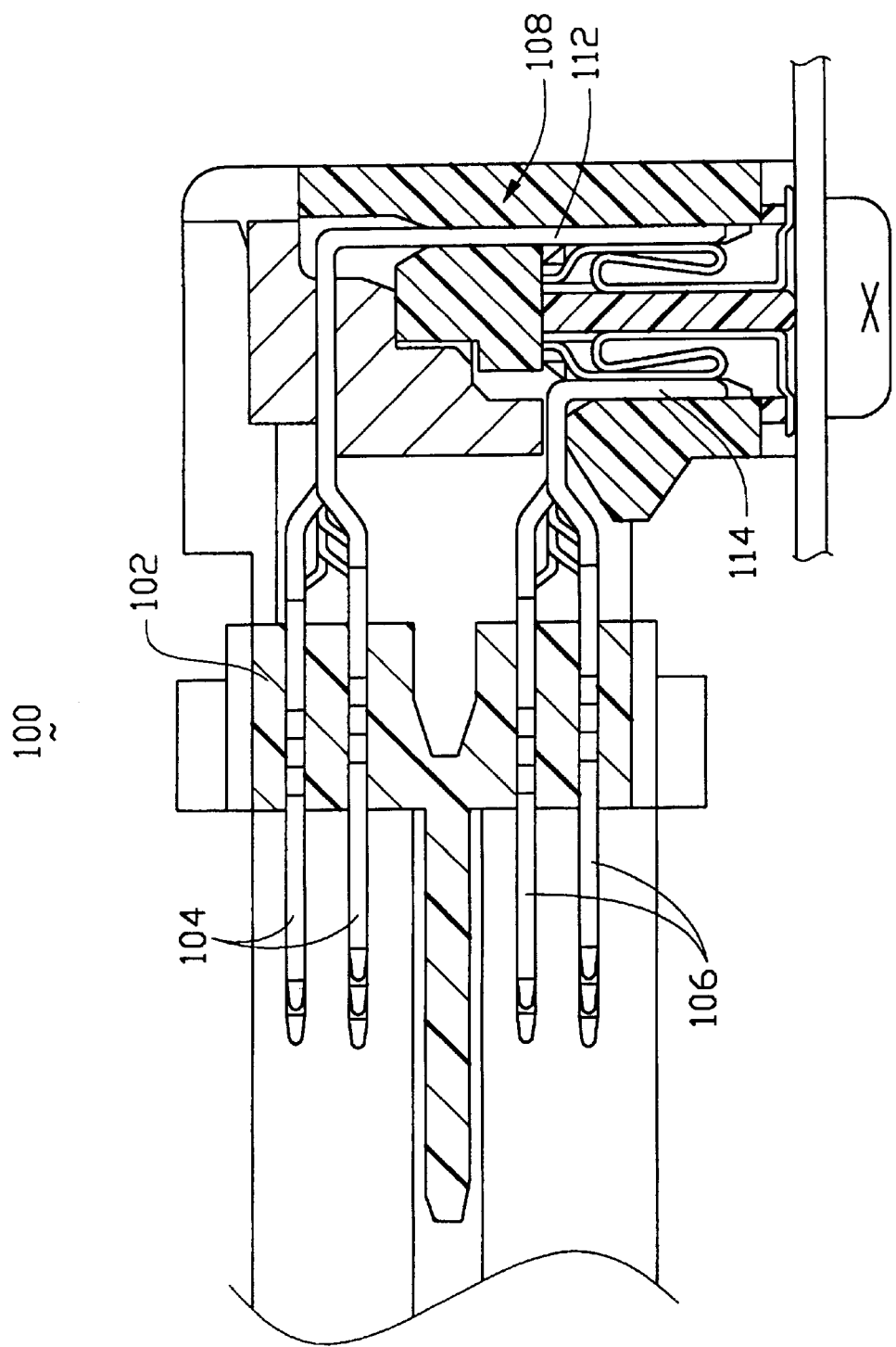
FIG. 1 is a cross sectional view of a conventional IC card connector assembly mounted on a printed circuit board.
Figure 2:
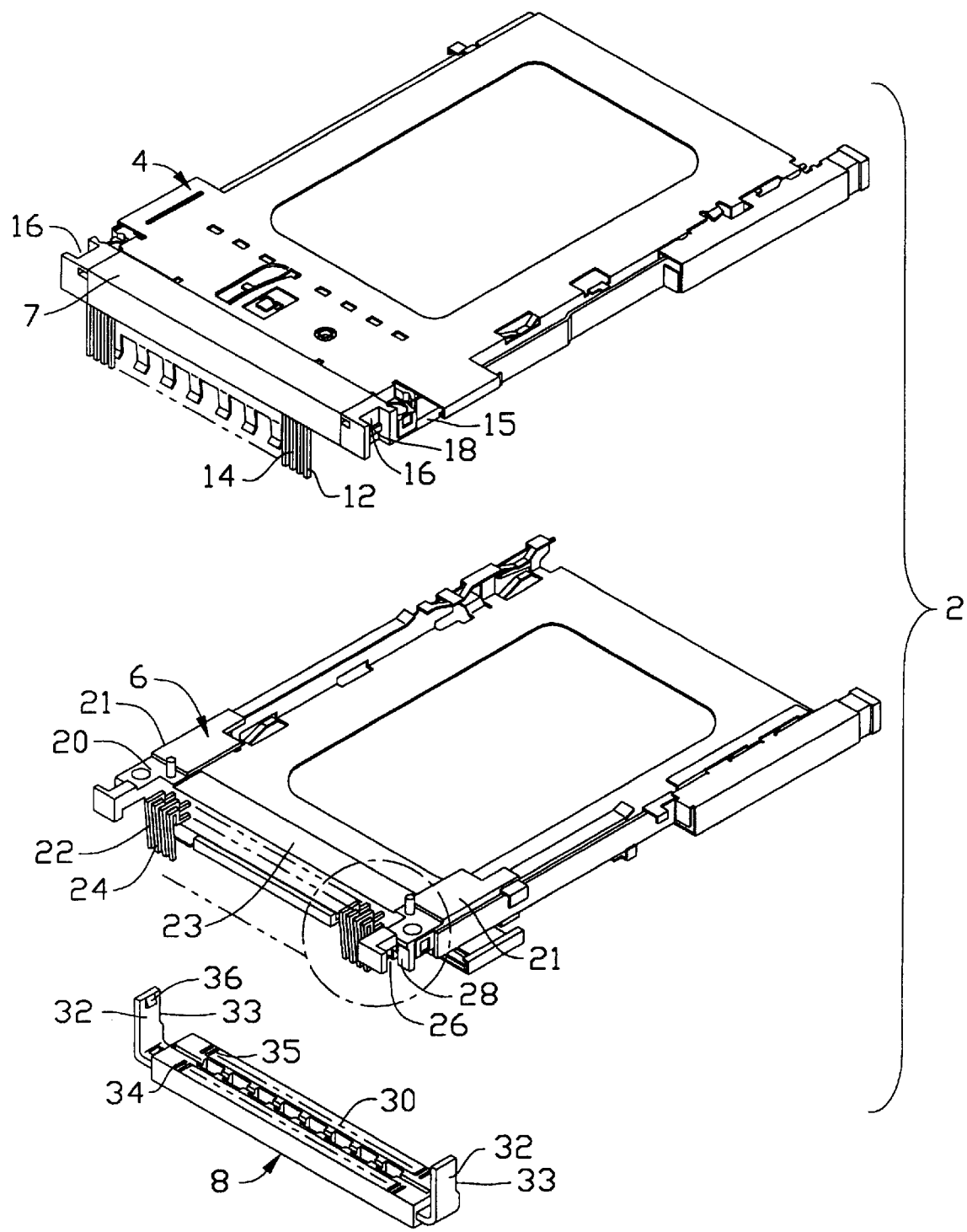
FIG. 2 is an exploded view of an IC card connector assembly in accordance with the present invention.
Figure 3:
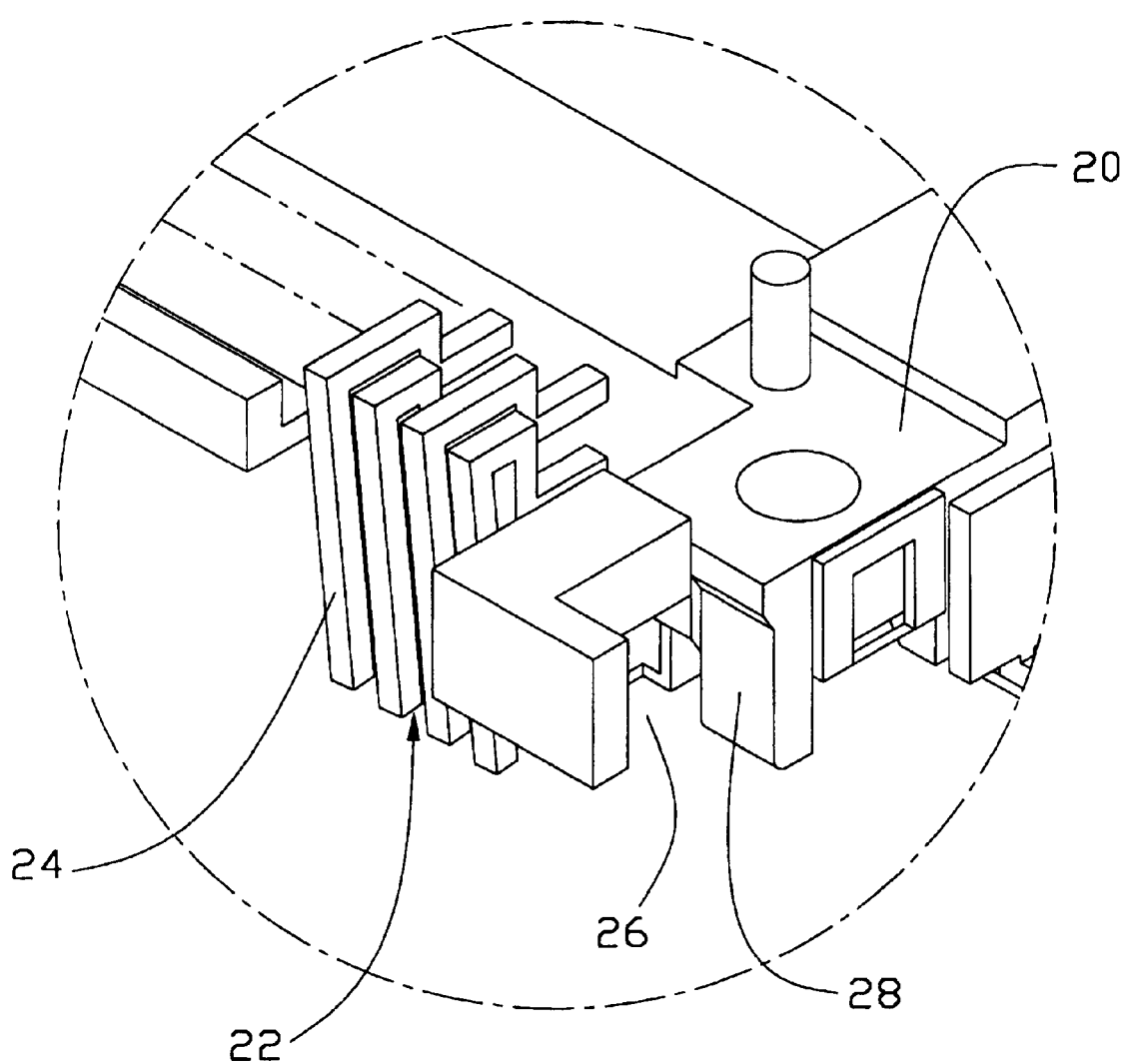
FIG. 3 is an enlarged fragmentary view of FIG. 2.
Figure 5A:
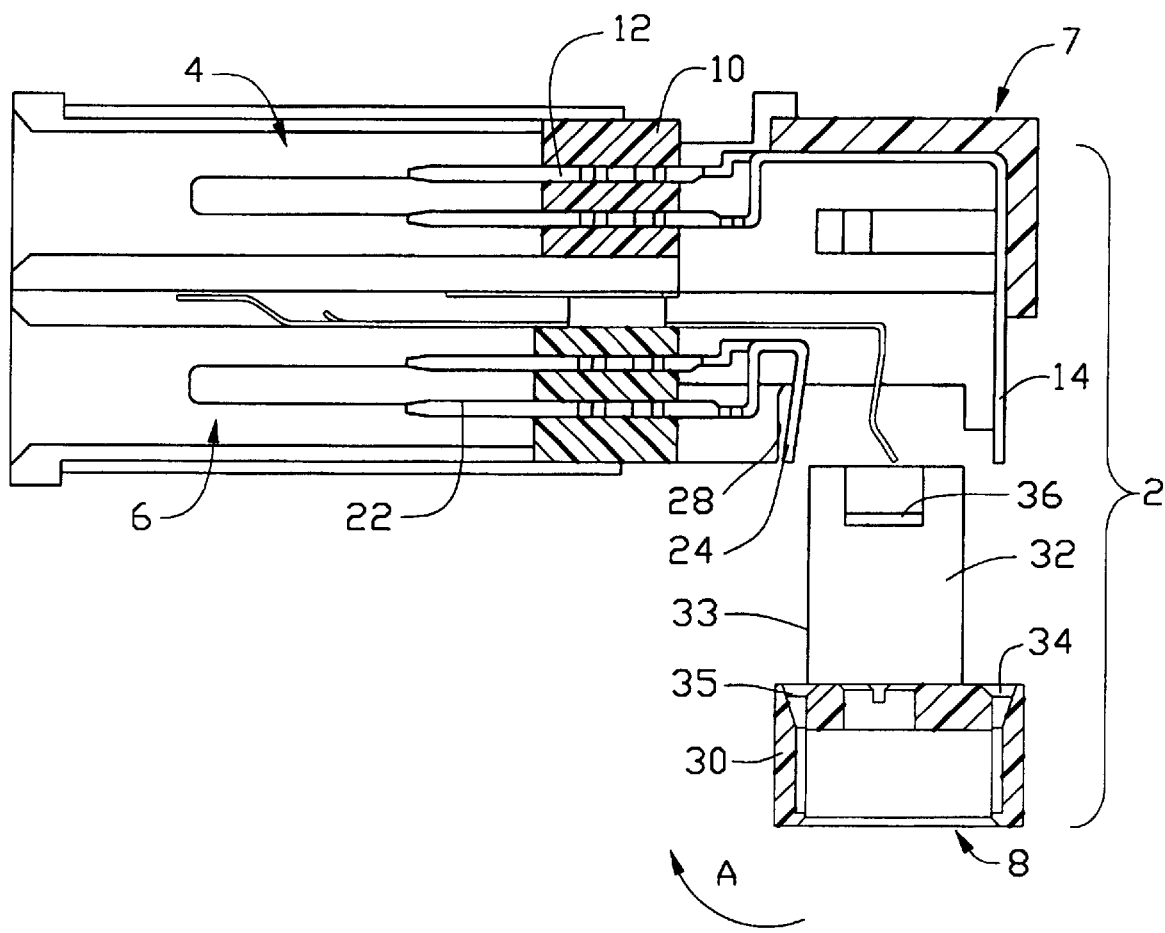
FIGS. 5A–5E are sequential, cross-sectional views of the IC card connector assembly showing how the rear socket is assembled to the lower and upper connectors to correctly arrange contact tails thereof in the rear socket.
Figure 5B:
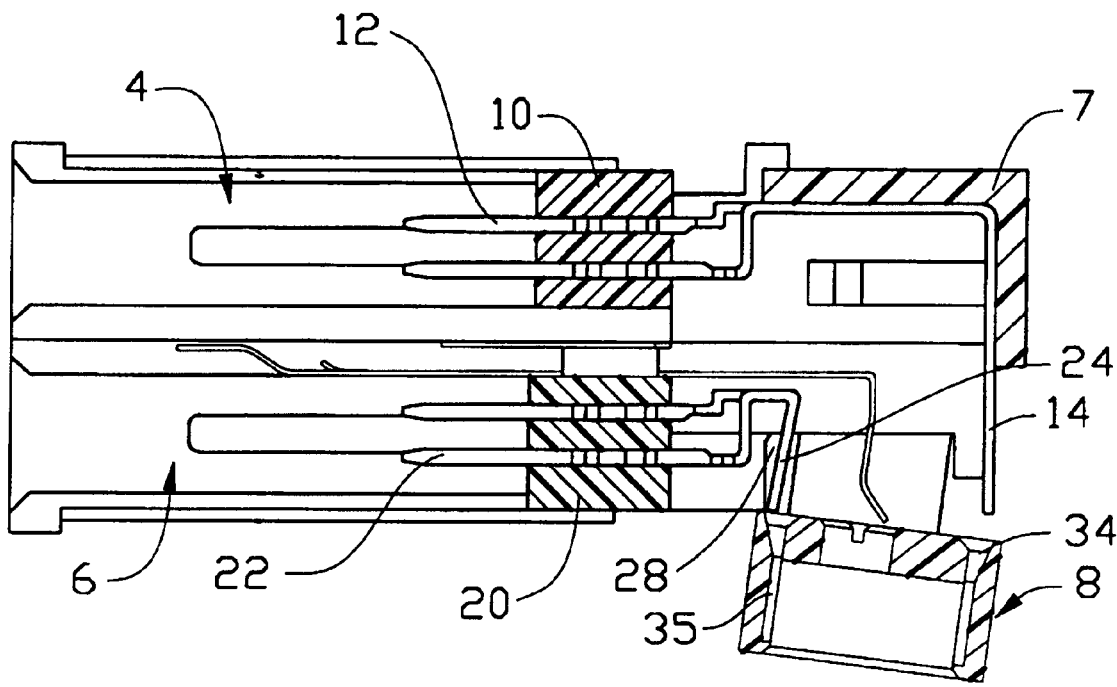
Figure 5C:
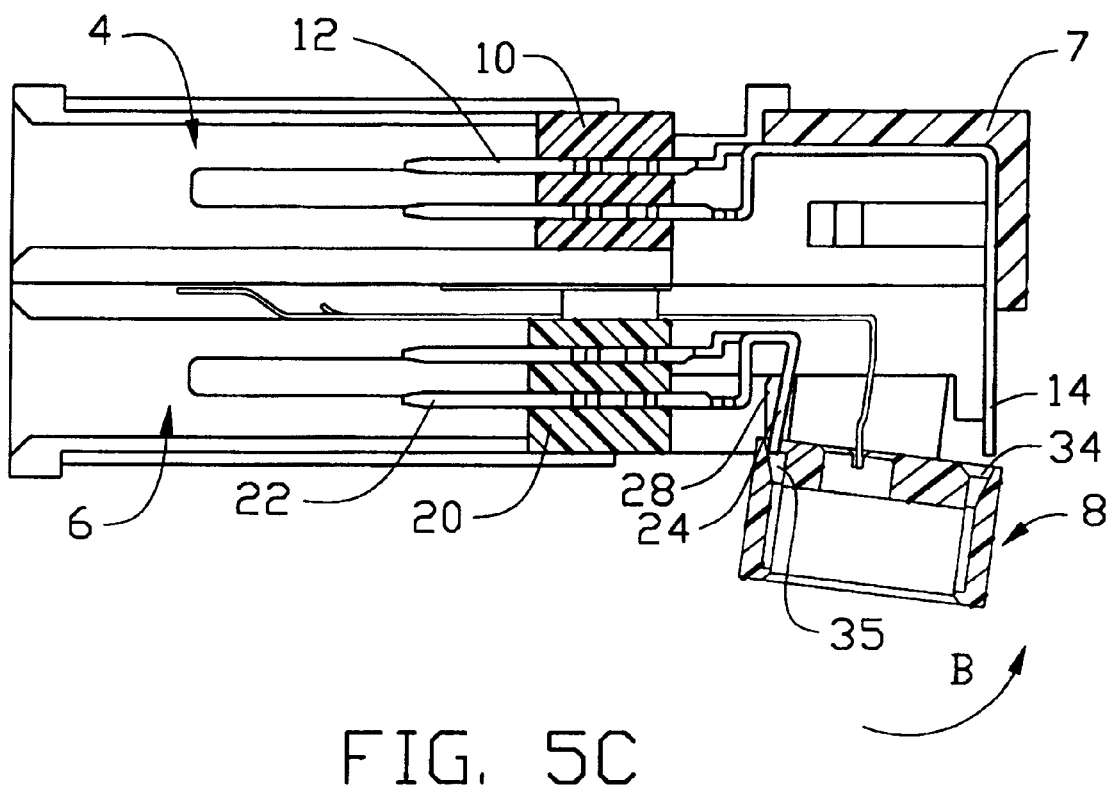
Figure 5D:
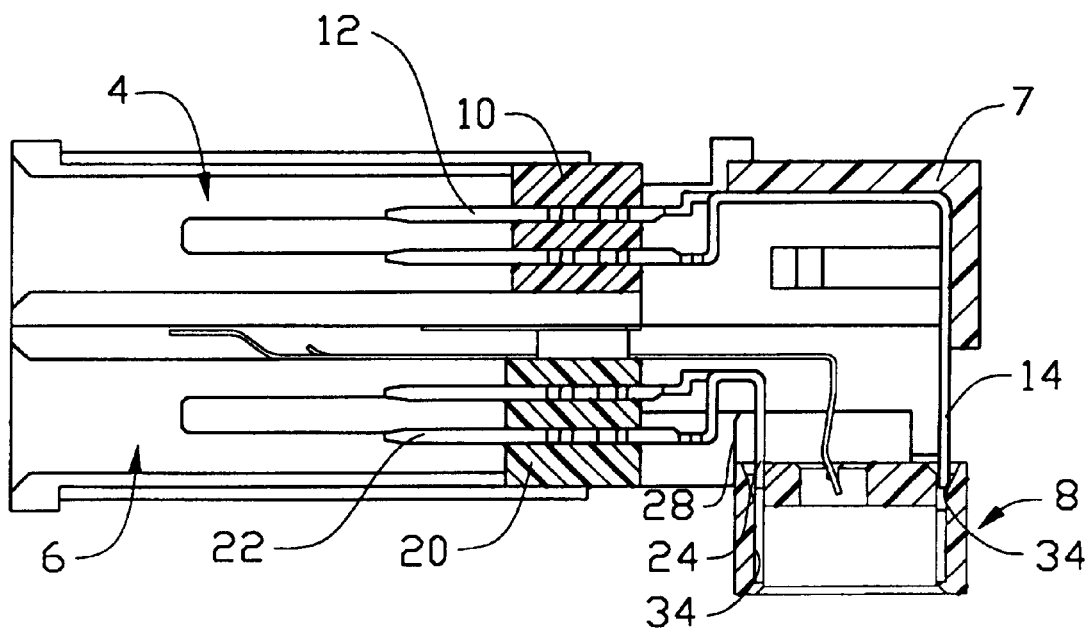
Figure 5E:
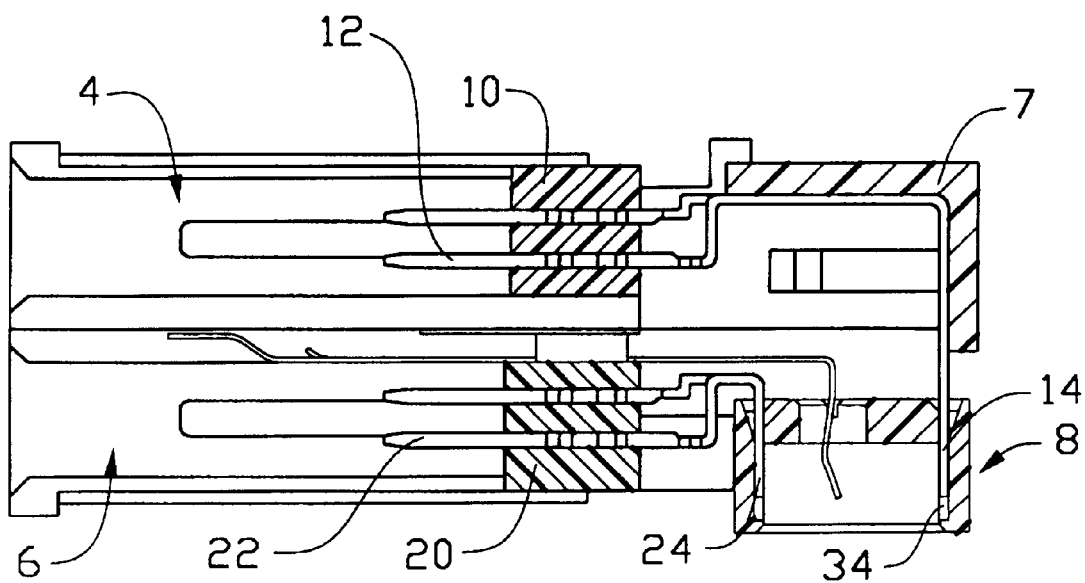
Figure 6:
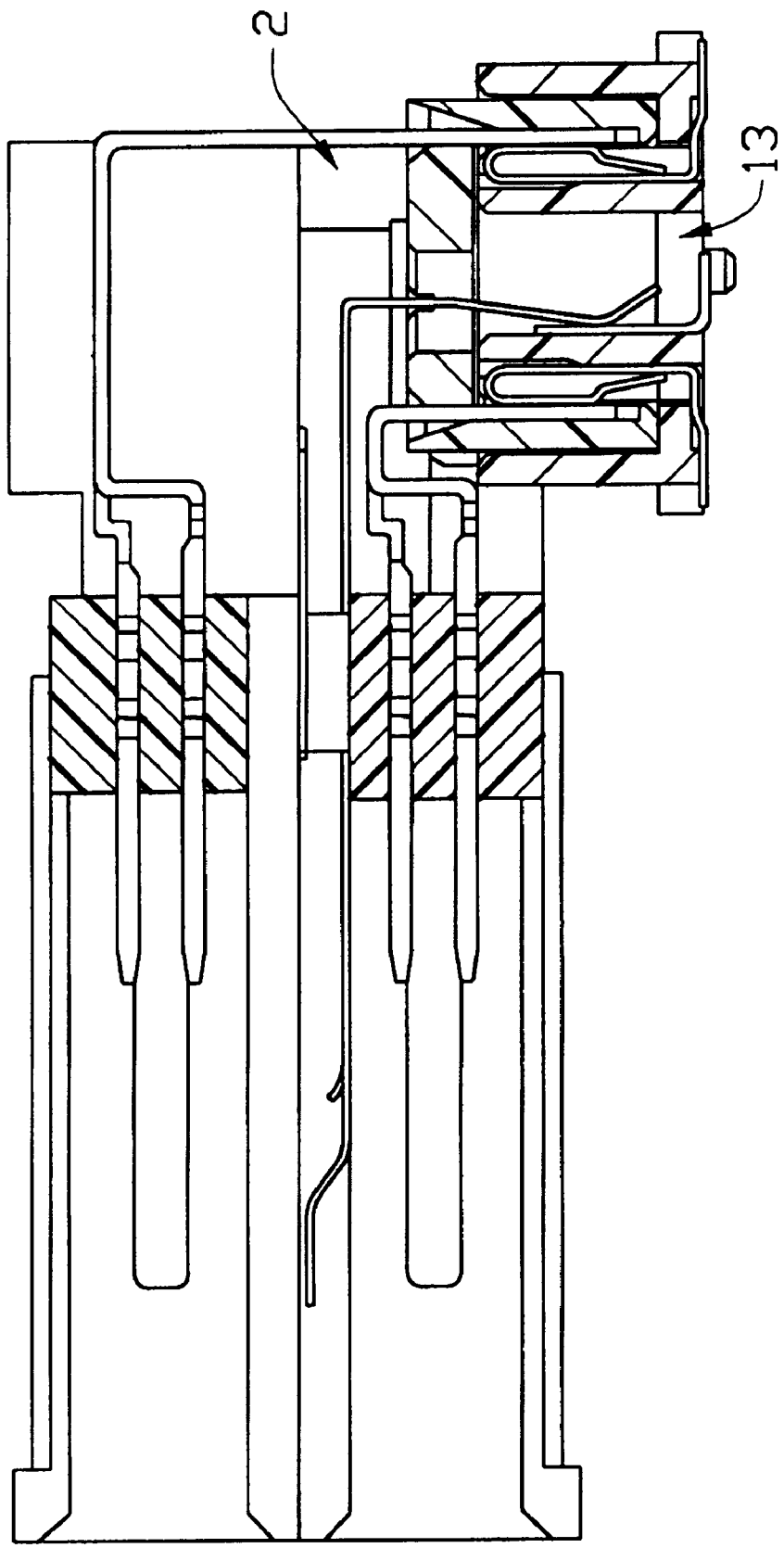
FIG. 6 is a cross-sectional view of the IC card connector assembly mated with a rear socket.

Referring to FIGS. 2 and 3, an IC card connector assembly 2 in accordance with the present invention comprises an upper connector 4, a lower connector 6 on which the upper connector 4 stacks and an elongate rear socket 8. Also referring to FIG. 5A, the upper connector 4 includes an upper header 10, a spacer 7 and a row of upper contacts 12 retained in the upper header 10. Contact tails 14 of the upper contacts 12 are spaced from each other a predetermined distance and oriented in a vertical direction by the spacer 7. The upper header 10 includes a pair of upper sidebars 15 (only one shown). Each upper sidebar 15 has a rear end adapted for engaging with an upper metal shield (not label) and a front end adapted for engaging with the spacer 7 and the rear socket 8. In the specification, the place where contact tails are located is deemed as front site. Each front end defines a recess 16 in an outside face thereof. Furthermore, each front end forms a latch 18 in a corresponding recess 16. The contact tails 14 are used for mating with a rear socket 13 (FIG. 6).

The lower connector 6 includes a lower header 20 and a row of lower contacts 22 retained in the lower header 20. The lower header 20 includes a pair of lower sidebars 21 interconnected by a lower intermediate section 23. Each lower sidebar 21 defines a lower recess 26 in a side face of a front end thereof. The lower recess 26 is positioned in alignment with the upper recess 16 of the upper header 10 when the two connectors 4, 6 are stacked together. A stepped peripheral wall 28 is formed by each lower sidebar 21 facing a corresponding lower recess 26. The lower contacts 22 frontward extend beyond the intermediate section 23 and then downward extend to form lower contact tails 24 for mating with the rear socket 13. For achieving the goal that when the contact tails 24 are received in the rear socket 8, they can tightly abut an inner wall of the rear socket 8 so that they can be surely oriented in the vertical direction, each contact tail 24 is overbent to deflect an angle of about 10 degrees toward the intermediate section 23 from a vertical direction (FIG. 4).

The spacer 7 comprises two perpendicularly interconnected boards each forming a plurality of channels (without shown) in an inner face thereof for a proper arrangement of the lower contact tails 14 therein. The spacer 7 is positioned between the upper front ends of the upper sidebars 15. The rear socket 8 includes a base 30 and a pair of arms 32 laterally and upwardly extending from opposite ends of the base 30. The base 30 defines two rows of vertical through cavities 34, 35. for receiving the contact tails 14, 24 therein, respectively. Each arm 32 forms a stepped rear edge 33 facing the stepped peripheral walls 28 of the lower head 20, respectively. Each arm 32 forms a protrusion 36 for engaging with a corresponding latch 18 of the upper header 10 thereby securing the rear socket 8 to the upper and lower connectors 4, 6.

Figure 4:
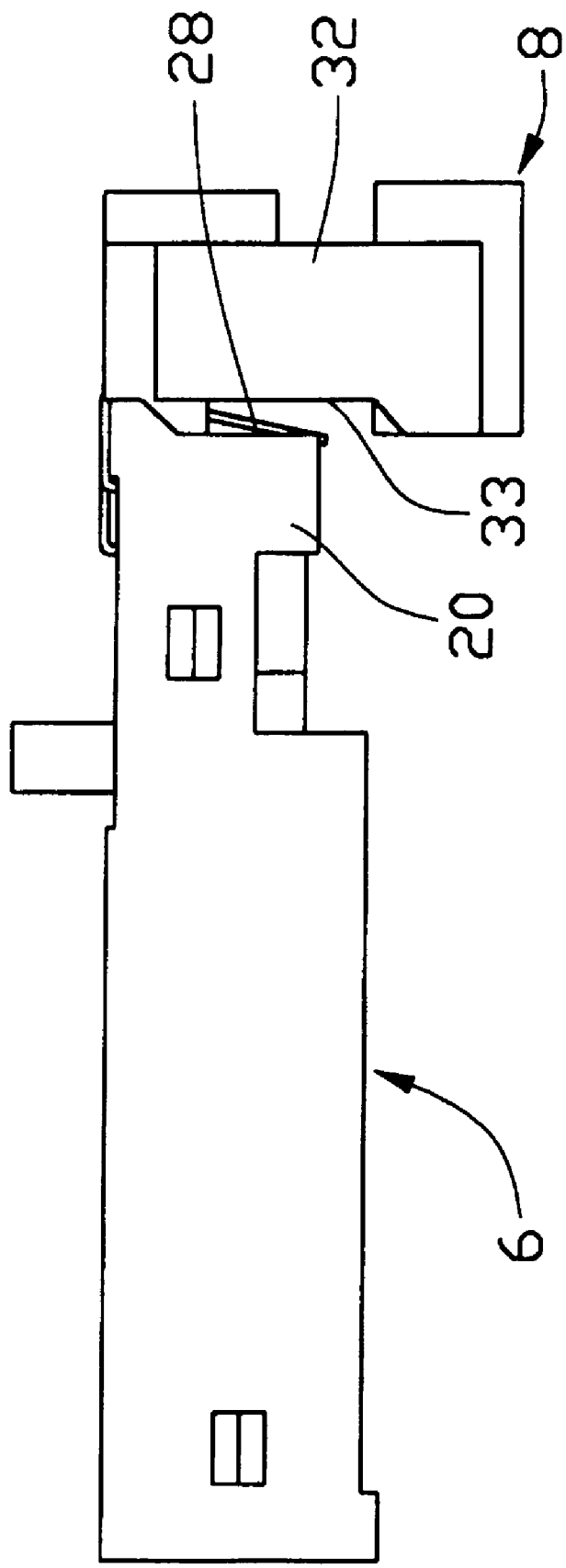
FIG. 4 is a side planar view of a lower connector and a rear socket of the IC card connector assembly in a semi-assembled state.

Referring to FIG. 4, when the rear socket 8 is upwardly assembled to the lower connector 6, the arms 32 are received in the lower recesses 26 of the lower header 20. A gap is formed between the stepped edges 33 and the stepped peripheral walls 28 thereby the rear socket 8 being able to pivot about 10 degrees toward the lower intermediate section 23 in the lower recesses 26 to accommodate the upper contact tails 24 therein.

Referring to FIGS. 5A–5E, in assembly, the rear socket 8 is upwardly assembled to the upper and lower connectors 4, 6 to properly accommodate the upper and lower contact tails 14, 24 in the two rows of cavities 34, 35 thereof. Firstly, the rear socket 8 moves upwardly until the arms 32 are received in the lower recesses 26. The rear socket 8 then is pivoted about 10 degrees in a direction indicated by arrow "A". Furthermore, the rear socket 8 moves toward the lower contact tails 24 and accommodates the lower contact tails 24 in the row of cavities 34 thereof. The rear socket 8 is then pivoted in a reversed direction relative to the direction "A" which is indicated by arrow "B" to a vertical position. The lower contact tails 24 are deflected in the direction "B" to securely abut against peripheral walls of the cavities 34 and pre-load is produced thereon. The lower contact tails 14 are received in the row of cavities 35 and securely abut against peripheral walls of the row of cavities 35. At last, the rear socket 8 further moves upwardly until the arms 32 are received in the upper recesses 16 and the protrusions 36 engage with the latches 18 of the upper header 10. The arms 32 rightly fit within the lower and upper recesses 26, 16.

Referring to FIG. 6, the IC card connector assembly 2 of the present invention is then mounted to a printed circuit board (not shown) by having the rear socket 8 mated with the rear socket 13 which has already been soldered to the printed circuit board thereby achieving an electrical connection between the connector assembly 2 and the printed circuit board. In the present invention, as the orientation of the contact tails 24, 14 is manipulated by the rear socket 8 to be vertically oriented, they can properly and easily engage with contacts in the rear socket 13.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. An electronic card connector assembly comprising:

an upper connector including an upper header and a row of upper contacts received in the upper header, the upper header forming two upper sidebars interconnected by an upper intermediate section, each upper contact comprising a contact tail;

a lower connector on which the upper connector stacks, the lower connector including a lower header and a row of lower contacts received in the lower header, the lower header forming two lower sidebars interconnected by a lower intermediate section, each lower contact comprising a contact tail inclined to be non-parallel to the contact tail of the upper contact; and a rear socket including an elongate base and a pair of upwardly extending arms for being secured to the upper connector, the base defining two rows of cavities, the rear socket being tiltable to align one row of cavities with the lower contact tails while the pair of arms is semi-assembled to the lower connector and then being tiltable to align the other row of cavities with the upper contact tails, thereby being upwardly fully assembled to the upper connector, the lower contact tails being resiliently deflected to abut against a periphery of the associated cavities of the base;

wherein each upper sidebar defines an upper recess in an outside face thereof and each lower sidebar defines a lower recess in an outside face thereof for accommodating the pair of arms;

wherein each lower recess comprises a lower ladder-shaped peripheral wall adjacent to the lower intermediate section, thereby producing a gap between a side edge of each arm and the lower ladder-shaped peripheral wall while the pair of arms is semi-assembled to the lower connector;

wherein each arm has a ladder-shaped side edge, thereby producing a wider gap between the ladder-shaped side edge and the lower ladder-shaped peripheral wall while the pair of arms is seni-assembled to the lower connector;

wherein the upper recess comprises an upper peripheral wall parallel to the upper sidebar and wherein a latch is formed in the upper peripheral wall;

wherein each arm forms a protrusion in an inner face thereof, in the assembled state, the protrusions engaging with corresponding latches of the upper header thereby retaining the rear socket in the upper connector;

further comprising a spacer engaged with the upper sidebars for supporting the upper contact tails.

* * * * *